United States Patent
Nijsen (12) 
(10) Patent No.: US 6,257,628 B1
(45) Date of Patent: Jul. 10, 2001

(54) COUPLING DEVICE

(75) Inventor: Dries Nijsen, Enschede (NL)

(73) Assignee: Georg Rischer Waga N.V., Pa Epe (NL)

(*) Notice: Subject to any disclaimer, the term of this patent is extended or adjusted under 35 U.S.C. 154(b) by 0 days.

(21) Appl. No.: 08/790,146

(22) Filed: Jan. 28, 1997

(30) Foreign Application Priority Data

Mar. 4, 1996 (NL) .................................... 1002514

(51) Int. Cl.[7] .................................................. F16L 21/06
(52) U.S. Cl. ............................ 285/323; 285/322; 285/96
(58) Field of Search ........................... 285/105, 106, 285/96, 340, 341, 342, 343, 322, 323, 337, 368, 148.23, 123.6; 277/546, 547

(56) References Cited

U.S. PATENT DOCUMENTS

| 2,201,372 | * | 5/1940 | Miller | 285/105 |
| 2,230,725 | * | 2/1941 | Nathan | 285/340 X |
| 3,288,497 | * | 11/1966 | Nydam | 285/148.23 |
| 3,486,772 | * | 12/1969 | Elsner | 285/96 |
| 3,860,270 | * | 1/1975 | Arnold | 285/96 X |
| 4,119,335 | * | 10/1978 | Rieffle et al. | 285/368 X |
| 4,676,531 | * | 6/1987 | Martin | 285/96 |
| 5,037,144 | * | 8/1991 | Peting et al. | 285/323 X |
| 5,188,401 | * | 2/1993 | Stainforth | 285/341 X |
| 5,350,204 | * | 9/1994 | Henniger | 285/323 |
| 5,476,292 |   | 12/1995 | Harper | 285/337 |

FOREIGN PATENT DOCUMENTS

| 2731464 | * | 3/1978 | (DE) | 285/105 |
| 4219722 | * | 12/1993 | (DE) | 285/341 |
| 0 418 961 |   | 3/1991 | (EP) . | |
| 2072296 |   | 9/1971 | (FR) . | |
| 63780 |   | 4/1934 | (NL) . | |
| 4002770 | * | 2/1994 | (WO) | 285/368 |

* cited by examiner

Primary Examiner—Teri Pham Luu
(74) Attorney, Agent, or Firm—Darby & Darby (57) ABSTRACT

The invention relates to a coupling device for a tube comprising a sleeve part having at least one insert end for the tube and a sealing part suitable to provide a seal around the tube inserted into the sleeve part. The sealing organ comprises a plurality of substantially identical, slidably abutting elements which form part of a substantially closed ring. The elements increase radially in thickness. Furthermore pressure means are provided for pressing the elements against the tube.

30 Claims, 7 Drawing Sheets

COUPLING DEVICE

The present invention relates to a coupling device a tube comprising a sleeve part having at least one insert end for the tube and a sealing organ suitable to provide a seal around the tube inserted into the sleeve part.

Such a coupling device is known from the European patent No. 0 418 961. In this known coupling device a sealing organ is used consisting of an inner ring enclosed by a rubber sealing jacket, which inner ring is supported by supporting surfaces of the sleeve part so as to push this sealing ring against the outer wall of the tube. This known coupling device is capable of accepting and coupling tubes having different diameters so that a seal is provided for liquid, gas and solids, and tubes of different diameters and, if required, different materials can be coupled to each other.

This can be achieved with the known sealing ring because it can be compressed in circumferential direction and to a certain extent around the tube so that it is possible to adapt to the different tube diameters, while in cross-section the sealing ring retains its form relatively well.

This known device still exhibits a number of problems. First, when using the known coupling device with smaller tube diameters, the support of the sealing ring may pose a problem due to the sealing ring having to be deformed to such an extent that the sealing effect is no longer guaranteed. Another problem with the known coupling device is that it does not have sufficient tensile strength. These coupling devices are usually applied to couple underground tubes, for instance under a road. Through movement of the ground, possibly caused by traffic, such a coupling is not imbedded securely and due to displacement of sand and the like the coupling of the known coupling devices may loosen so that leakage occurs.

The invention now aims to offer a solution to these problems. To this effect the coupling device of the invention is characterized in that the sealing organ comprises a plurality of slidably abutting elements forming part of a substantially closed ring, and which elements radially increase in thickness, and which organ is further provided with pressure means for pressing the elements against the tube inserted into the coupling device.

The coupling device according to the invention provides seals which can be used both inside and outside of the tube. The pressure means serve to press the elements against the tube from the outside inward respectively from the inside outward to conform to the tube.

In this way the ring formed by the elements can, with respect to diameter, easily adapt to the tube to be sealed, while also easily accommodating irregularities in the surface of the tube. The elements could be arched but it is preferable that the elements are substantially wedge-shaped. The lateral faces forming the wedge of the wedge-shaped elements may, for instance, form an angle of 60°, in which case 60 wedge-shaped elements suffice to form the closed ring. The sealing ring may, for a part, also consist of differently shaped elements, but also other numbers of such elements are possible. For instance, if the angle between the wedge-forming lateral faces is 5°, 72 elements are required to form the closed ring. The more elements are used, the finer the distribution and closer the fit against the tube to be sealed.

The invention is based on the surprising realization that by shifting the abutting elements the elements rotate so that diameter adjustment takes place by means of the elements forming the closed ring. When applied to the outside of the tube, the desired diameter is adjusted by starting with a larger diameter and then pressing the elements by means of the pressure means against the tube, whereby adjustment to the desired diameter of the closed ring occurs automatically.

In order to obtain the required firmness of the seal it is desirable that each element is provided with a notch on a first side and a projection on a second side opposite the first side of the element, which notch and projection are suitable to interact with a corresponding projection respectively notch of an abutting element. This locks the sealing organ to prevent mutual wrenching of the elements.

The sealing effect of the coupling device according to the invention is aided by the fact that the sealing organ comprises a rubber ring, a portion at least of which is placed between the tube and the elements. It is conceivable to have the rubber ring completely surrounding the assembly of elements, but this is not necessary to achieve the aim of the invention.

In an alternative embodiment the side of the elements abutting against the tube are partly made of rubber. The tension-relieving effect of the coupling device according to the invention is achieved in particular if at least some of the elements are for a part provided with a rough surface abutting against the tube. For this there are also different options possible. For instance, one or more elements may be provided with a toothed grip element. This relieves the tension very effectively. It is, however, also possible to provide the rough surface by glueing sand grains on to the particular surface of the elements. In another embodiment the elements are provided with a grip ring extending at least over part of the circumference of the tube.

To support the tension-relieving effect at least some of the elements that are distributed evenly over the circumference of the tube may be made of a material harder than that of the tube, such as metal, and preferably stainless steel.

To optimize the close fit of the elements abutting against the tube in circumferential direction, independently of the tube's diameter discrepancies, the elements' surface abutting against the tube is arched in the circumferential direction of the tube.

Various systems could serve as pressure means for the wedge-shaped elements.

In a first embodiment of the coupling means according to the invention the pressure means for the elements are provided with a hydraulic ring-shaped chamber containing the elements which serve this chamber as a displaceable wall; the hydraulic chamber is also provided with a sealable connecting opening for the supply of a fluid to produce the hydraulic pressure in the chamber.

However, in an alternative embodiment the coupling device is executed such that the sleeve part, at least around the tube, is provided with a support surface for the elements, the diameter of which support surface in longitudinal direction of the tube decreases, respectively increases, whereby the support surface, by interaction with the elements, forms the pressure means for pressing the elements against the tube.

The invention is also embodied in a separate sealing organ and a separate wedge-shaped element such as can be applied in the coupling device according to the invention.

The invention will now be further elucidated with reference to the drawing of a non-limiting embodiment in which.

Parts that are the same have the same reference numbers in the Figures.

Figure 1A:
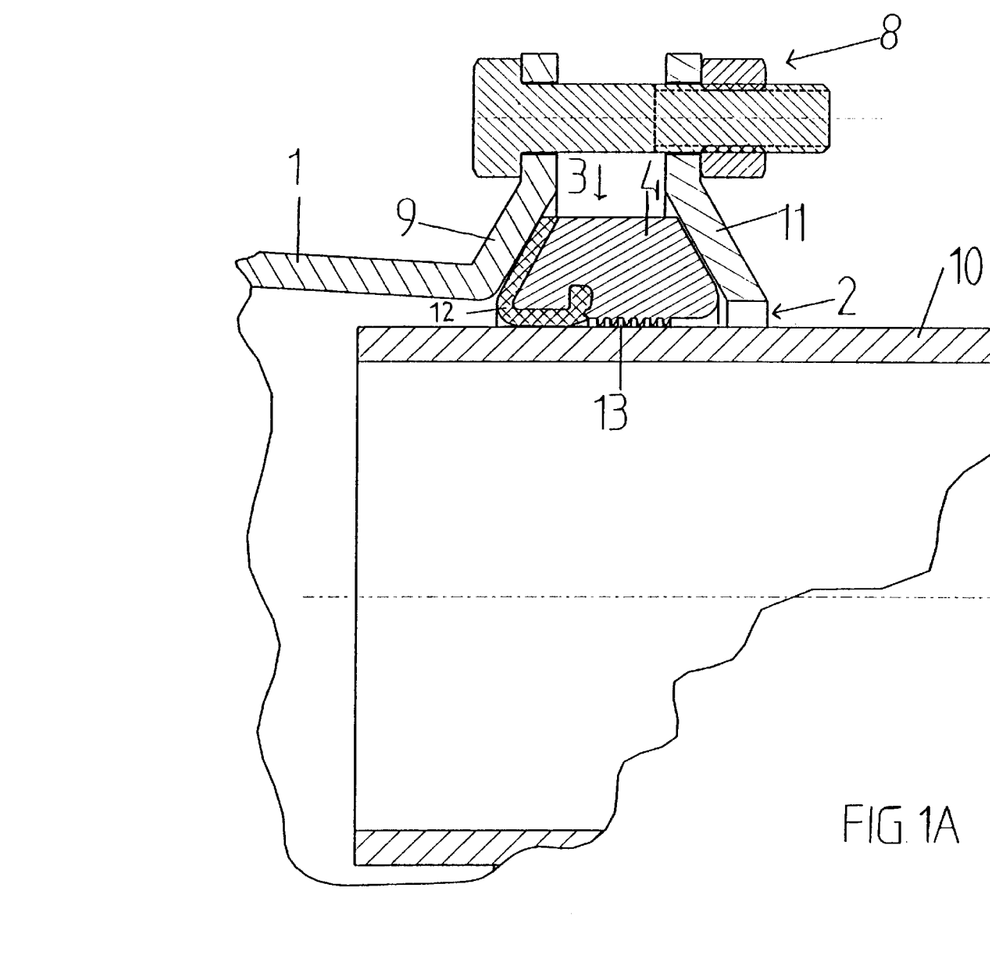
FIG. 1A shows a longitudinal section through a part of a first embodiment of the coupling device according to the invention.
Figure 1B:
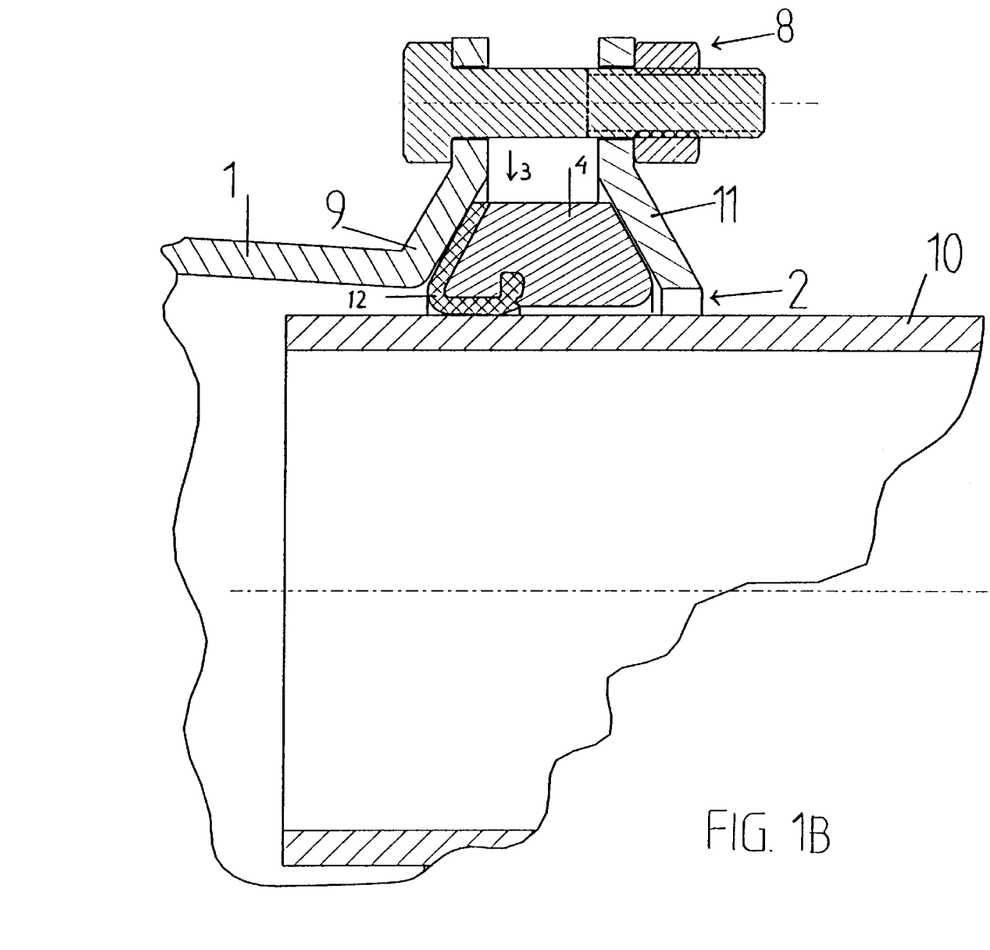
FIG. 1B shows a longitudinal section through a part of a second embodiment according to the invention.
Figure 2:
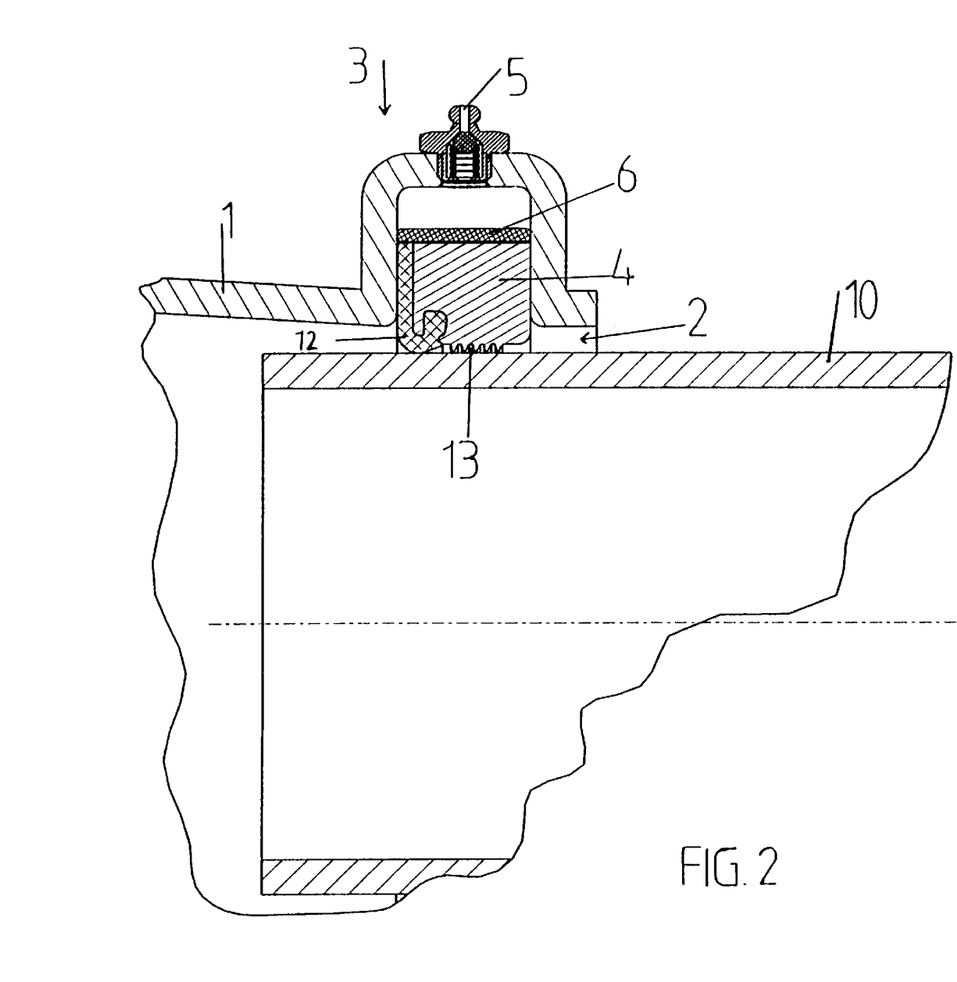
FIG. 2 shows a longitudinal section through a third embodiment of a coupling device according to the invention.

FIGS. 1A, 1B and 2 show a first, a second and a third embodiment of the coupling device according to the invention, comprising a sleeve part 1 having an insert end 2 for the tube 10 and a sealing organ 3 which is suitable for providing a seal around the tube 10 inserted into the sleeve part 1. According to the invention the sealing part 3 comprises a plurality of uniform arched or wedge-shaped elements 4; see also FIGS. 3A and 3B, which show these two embodiments of the assembled elements from a side view.

Figure 3A:
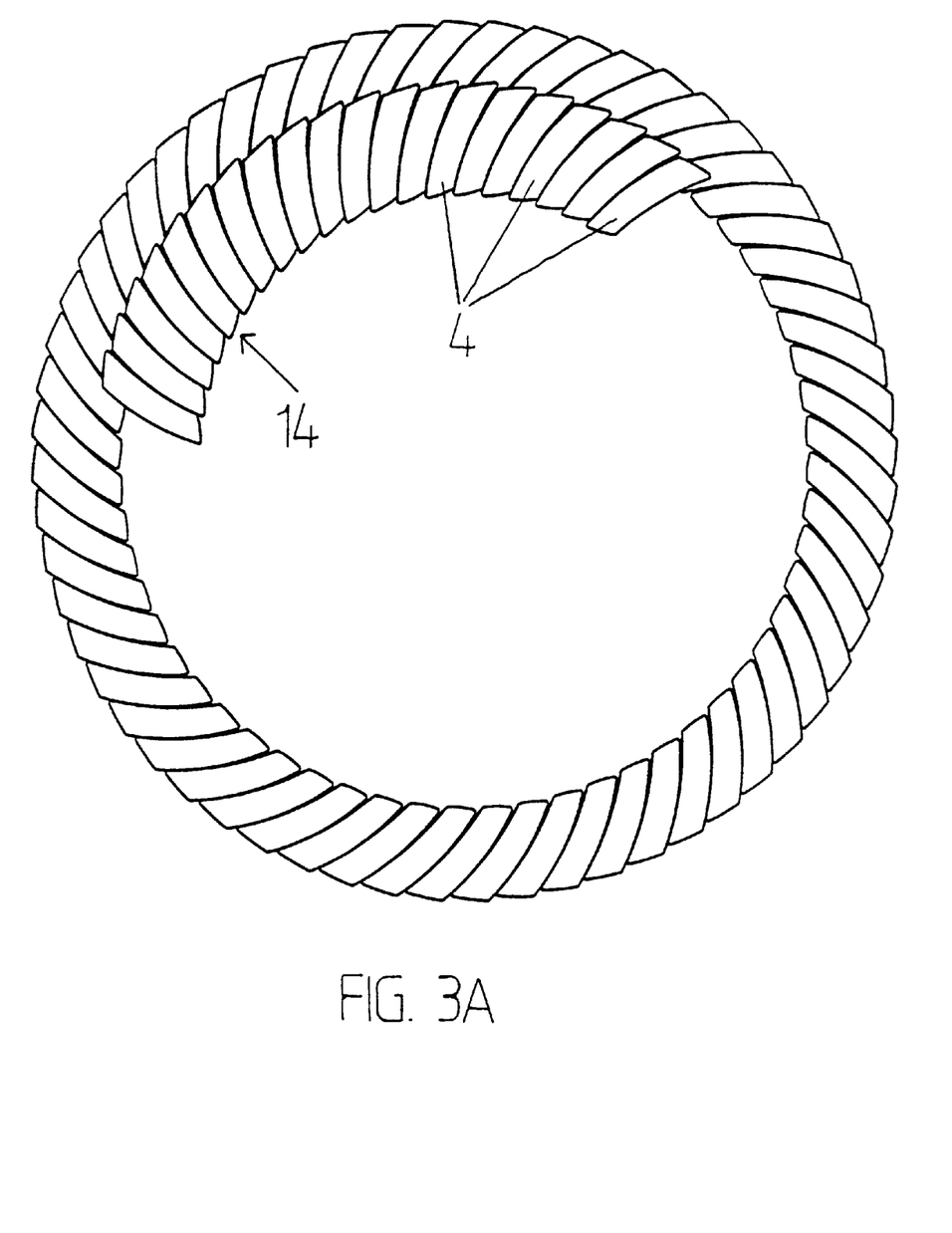
FIG. 3A shows a side view of the arched elements forming a closed ring according to the invention.
Figure 3B:
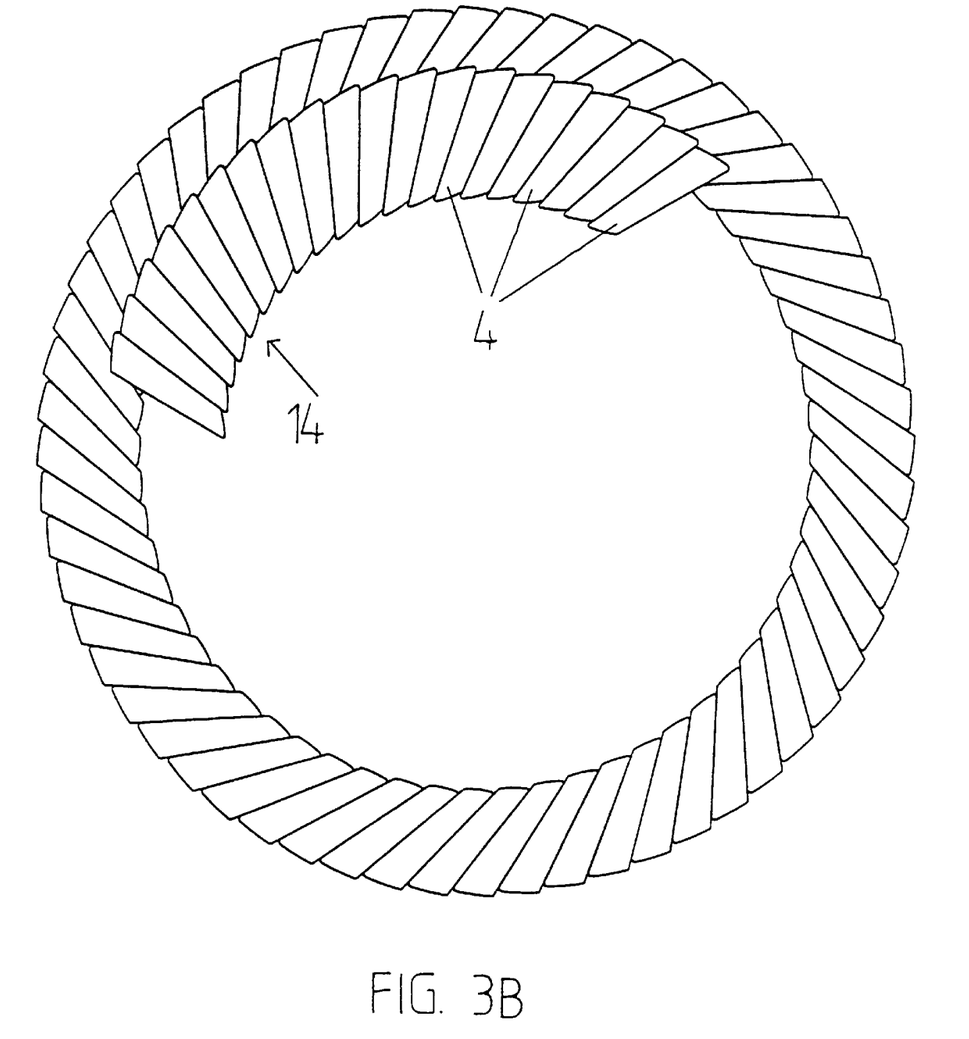
FIG. 3B shows a side view of the wedge-shaped elements forming a closed ring according to the invention.
Figure 4:
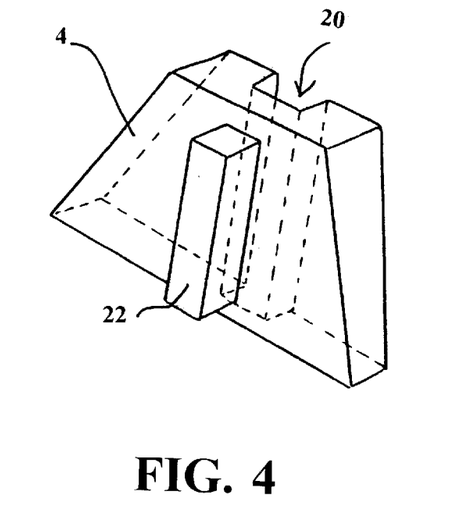
FIG. 4 shows a perspective view of a wedge-shaped element.
Figure 5:
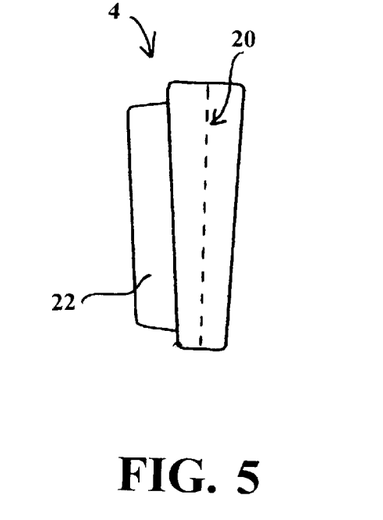
FIG. 5 shows a side view of the wedge-shaped element of FIG. 4.
Figure 8:
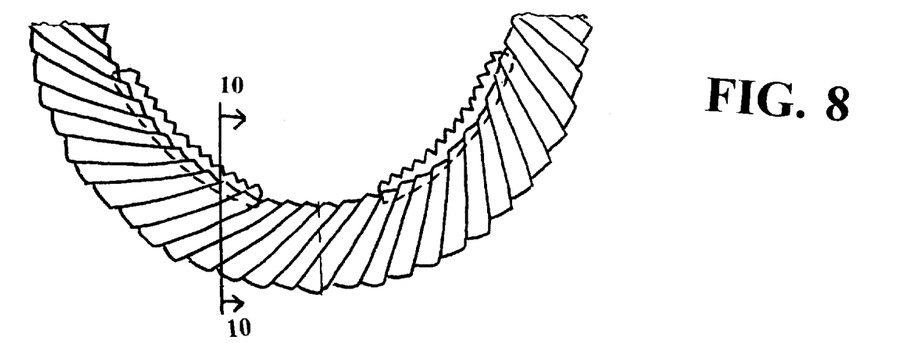
FIG. 8 shows a side view of the coupling device.
Figure 9:
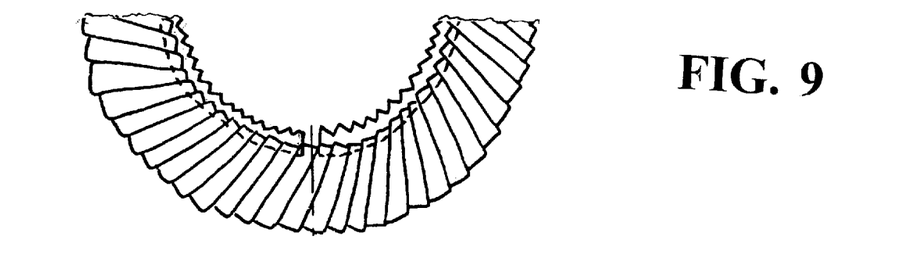
FIG. 9 shows the coupling device of FIG. 8 in a contracted state with a smaller diameter.
Figures 10, 11:
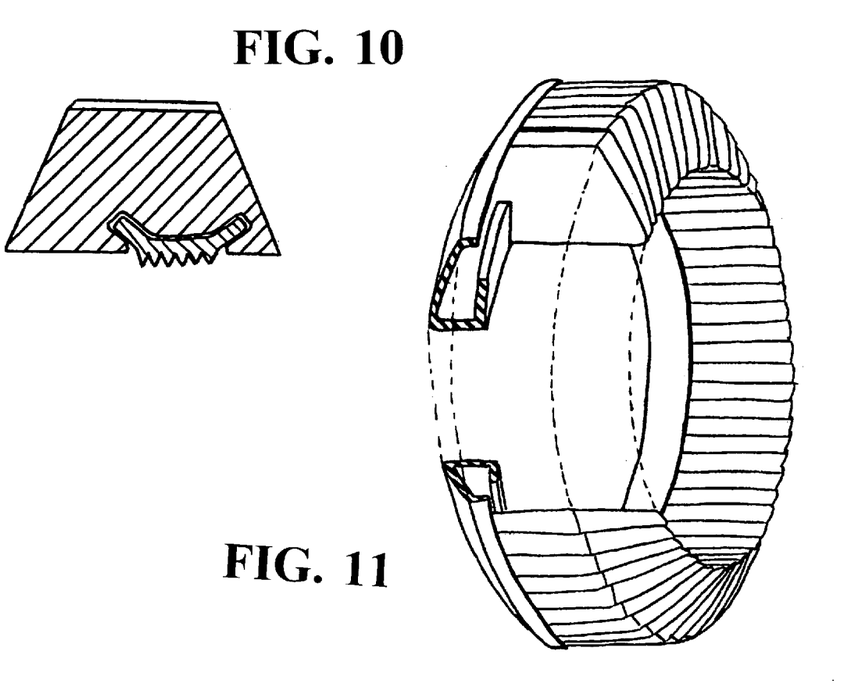
FIG. 10 shows a cross-sectional view of the coupling device of FIG. 8 along lines 10—10.
FIG. 11 shows a perspective view of the coupling device.

As can be seen from FIGS. 3A and 3B as well as FIGS. 8 and 10–11, the arched, respectively the wedge-shaped elements 4 together form a closed ring. FIGS. 3A and 3B also show part of the ring after interrotation of the elements 4 which decreases the ring diameter, as shown in FIG. 9. The embodiment of FIGS. 1A, 1B and 2 further provide pressure means 5, 6, 7, 8, 9, 11 for pressing the various elements 4 against the tube 10. Each of the arched, respectively wedge-shaped elements 4 is provided with a notch 20 on a first side and a projection 22 on a second side of element 4 situated opposite the first side, as shown in FIGS. 4–5, which serve for their interaction with a corresponding projection respectively notch on an abutting element 4.

FIGS. 1A and 1B show that the sealing organ 3 comprises a rubber ring 12, a portion at least of which is placed between the tube 10 and the arched respectively wedge-shaped elements 4. An alternative embodiment (not shown), could be that the side of the elements 4 which abuts against the tube 10 and a support surface 9, itself is partly made of rubber.

Figure 6:
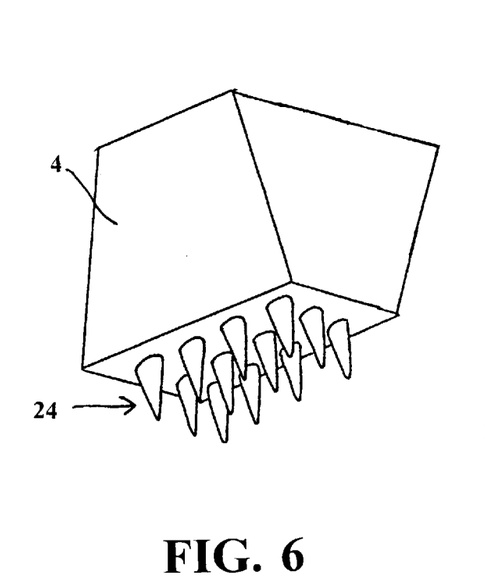
FIG. 6 shows a wedge-shaped element having a rough surface.
Figure 7:
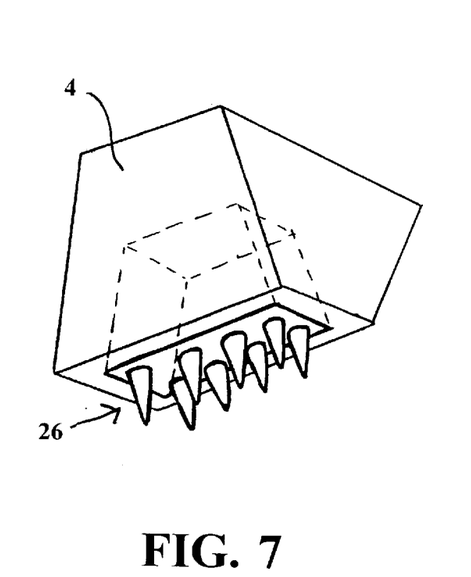
FIG. 7 shows an alternative embodiment of the wedge-shaped element having a rough surface.

As shown in FIGS. 1A and 2, at least some of the wedge-shaped elements 4 are partly provided with a rough surface 13 abutting against the tube 10. FIG. 1B shows the embodiment which lacks the rough surface. The rough surface may be realized in different ways, as shown by the rough surfaces 24, 26 in FIGS. 6–7, respectively. It is conceivable, for instance, that a recess of the ring formed by arched respectively wedge-shaped elements 4 is provided with a punched strip having a rough surface, or that the surface of the elements 4 facing the tube 10 is provided with a rough layer, for instance of sand. The rough surface 13 further promotes the tension-relieving effect for the coupling device while the above-mentioned rubber ring 12 promotes the sealing effect of the coupling device. An alternative aid for the tension-relieving effect consists in the even distribution along the circumference of the tube 10 of arched respectively wedge-shaped elements 4 made of metal, preferably stainless steel. This is not shown in the drawing.

Preferably surface 14 (see FIGS. 3A and 3B) of the arched or wedge-shaped elements 4, which is meant to abut against the tube 10, is a surface which is arched in circumferential direction of the tube and toward the tube. This results in a limited open space between the different elements 4 and the surface of the tube 10 against which they abut. In this way the arched or wedge-shaped elements 4 provide the best possible closed front in relation to the wall of the tube 10, which is important for the sealing effect of the seal 3.

FIGS. 1A and 1B further show a first embodiment of the pressure means 8, 9, 11 for the wedge-shaped elements 4. The embodiment of FIGS. 1A and 1B provides two support surfaces 9 and 11 which under the influence of coupling 8 can be moved toward each other, so that said support surfaces 9 and 11 exert a force on the elements 4 directed toward the tube 10.

FIG. 2 shows a further embodiment in which the side of the arched or wedge-shaped elements 4 which faces away from the tube 10 is provided with a hydraulic chamber 7 extending in ring form around the tube 10. The hydraulic chamber 7 is provided with a sealable connector opening 5 for the supply of a fluid to produce a hydraulic pressure in this chamber. This pressure acts on the elements 4 via a partition wall 6 which serves to prevent leaking of the fluid.

One of the advantages of the coupling device according to the invention is that within certain limits, determined by the form of the elements 4, the tube 10 may be turned axially in the coupling device without lessening the sealing effect of the coupling or the tension relief.

Another advantage is that the coupling device can also be applied with a nonround tube, as the wedge-shaped elements can simply be aligned accordingly whereby, in the event that sharp angle transitions occur, intermediate pieces can be used to bridge such angle transitions.

It may further be mentioned that the coupling device according to the invention is very tolerant to repair work, in particular in the case of continuous tubes, because the ring of connected elements 4 may be broken and reassembled at any point desired.

Finally it should be mentioned that the embodiments discussed only comprise examples, and that various alternative embodiments are possible without departing from the idea of the invention as specified in the claims below.

What is claimed is:

1. A coupling device for a tube, the tube having a longitudinal axis and a cross-sectional view perpendicular to said longitudinal axis, the coupling device comprising:

a sleeve part having at least one insert end for the tube;

a sealing organ mounted in said sleeve part and suitable to provide a seal around the tube inserted into the sleeve part, the sealing organ comprising a plurality of slidably abutting interlocking elements which, by being interlocked, form part of a substantially closed ring defining an inner surface, said elements increasing in thickness from first edges which define said inner surface radially outward away from said tube to opposite second edges, each of said elements having first and second interlocking lateral faces with one first interlocking lateral face slidably interlocking with one second interlocking lateral face of an abutting element, the mating between abutting elements permitting lateral movement between interlocked abutting elements such that said elements are slidable relative to each other generally radially with respect to said longitudinal axis to allow adaptation of said inner surface to variations in the diameter of said tube; and pressure means operatively associated with said sleeve part and suitable for pressing the plurality of interlocking elements of the sealing organ in said sleeve part against said tube, thereby holding said elements in sealed assembled relationship against said tube and sealing the coupling device to said tube.

2. The coupling device according to claim 1, wherein the elements are substantially wedge-shaped.

3. The coupling device according to claim 1, wherein each element is provided with a notch on a first side and a projection on a second side of the element opposite the first side, wherein a first projection of a first element is disposed within the respective notch of an abutting element.

4. The coupling device according to claim 1, wherein the sealing organ comprises a rubber ring of which at least a portion is placed between the tube and the elements.

5. The coupling device according to claim 1, wherein the side of the elements abutting against the tube are partly made of rubber.

6. The coupling device according to claim 1, wherein at least some elements are partly provided with a rough surface abutting against the tube.

7. The coupling device according to claim 6, wherein the rough surface is a toothed grip element incorporated in the element.

8. The coupling device according to claim 7, wherein the elements are provided with a grip ring extending at least over part of the circumference of the tube.

9. The coupling device according to claim 1, wherein at least one of the elements distributed evenly over the circumference of the tube is made of a material harder than that of the tube wherein the material is composed of metal.

10. The coupling device according to claim 1, wherein the surface of the elements abutting against the tube in circumferential direction, is a surface arched in the circumferential direction of and toward the tube.

11. The coupling device according to claim 1, wherein the pressure means for the elements comprise a hydraulic ring-shaped chamber containing the elements which constitute a displaceable wall of this chamber, and that the hydraulic chamber is provided with a sealable connecting opening for the supply of a fluid to produce the hydraulic pressure in the chamber.

12. The coupling device according to claim 1, wherein the sleeve part at least around the tube is provided with tapering support surfaces for the elements, whereby said support surfaces taper toward each other in the radial direction of the tube, and whereby the pressure means includes the support surfaces, by interaction with the elements, for pressing the elements against the tube.

13. A sealing organ which is adapted to be mounted in a sleeve part of a coupling device for providing a seal around a tube, the tube having a longitudinal axis and a cross-sectional view perpendicular to said longitudinal axis, the sealing organ comprising a plurality of slidably abutting interlocking elements which, by being interlocked, form part of a substantially closed ring defining an inner surface, said elements increasing in thickness from first edges which define said inner surface radially outward away from said tube to opposite second edges, each of said elements having first and second interlocking lateral faces with one first interlocking lateral face slidably interlocking with one second interlocking lateral face of an abutting element, the mating between abutting elements permitting lateral movement between interlocked abutting elements such that said elements are slidable relative to each other generally radially with respect to said longitudinal axis to allow adaptation of said inner surface to variations in the diameter of said tube, wherein said plurality of interlocking elements are held in a sealed assembled relationship in said sleeve part when pressed against said tube by pressure means associated with said sleeve part, thereby assisting in sealing the coupling device to said tube.

14. The sealing organ according to claim 13, wherein the elements are substantially wedge-shaped.

15. The sealing organ according to claim 13, wherein each element is provided with a notch on a first side and a projection on a second side of the element opposite the first side, wherein a first projection of a first element is disposed within the respective notch of an abutting element.

16. The sealing organ according to claim 13 comprising a rubber ring, at least of portion of which is adapted to be placed between the tube and the elements.

17. The sealing organ according to claim 13, wherein the sides of at least some of the interlocking elements are rubber and wherein the interlocking elements are positioned to abut against the tube.

18. The sealing organ according to claim 13, wherein at least some elements are partly provided with a rough surface for abutting against the tube.

19. The sealing organ according to claim 18, wherein the rough surface is a toothed grip element incorporated in the element.

20. The sealing organ according to claim 19, wherein the elements are provided with a grip ring which in use extends at least over part of the circumference of the tube.

21. The sealing organ according to claim 13, wherein at least one of the elements is made of a material harder than that of the tube, wherein the material is composed of metal.

22. The sealing organ according to claim 13, wherein the surface of the elements is arched in the circumferential direction corresponding to the radius of curvature of the tube.

23. An interlocking element for use as part of a sealing organ suitable to be mounted in a sleeve part of a coupling device for providing a seal around a tube, the tube having a longitudinal axis and a cross-sectional view perpendicular to said longitudinal axis, the interlocking element comprising means for slidably and abuttingly interlocking said element with a plurality of other such elements to form a substantially closed ring of said interlocking elements suitable for mounting on said tube such that said plurality of interlocking elements increase in thickness from first edges radially outward away from said tube to opposite second edges radially outwards with respect to said longitudinal axis when viewed from said cross-sectional view and such that said first edges of said closed ring define an inner surface interfacing said tube, each of said plurality of interlocking elements having first and second interlocking lateral faces with one first interlocking lateral face slidably interlocking with one second interlocking lateral face of an abutting element, the mating between abutting elements permitting lateral movement between interlocked abutting elements such that said elements are slidable relative to each other generally radially with respect to said longitudinal axis to allow adaptation of said inner surface to variations in the diameter of said tube, wherein said element is held in a sealed assembled relationship with said plurality of other such elements in said sleeve part when pressed against said tube by pressure means associated with said sleeve part, thereby assisting in sealing the coupling device to said tube.

24. The element according to claim 23, wherein the element is substantially wedge-shaped.

25. The element according to claim 23, wherein the element is provided with a notch on a first side and a projection on a second side of the element opposite the first side, wherein a first projection of a first element is disposed within the respective notch of an abutting element.

26. The element according to claim 23, wherein the side of the elements intended to abut against the tube are partly made of rubber.

27. The element according to claim 23, wherein the element is partly provided with a rough surface on the side intended to abut against the tube.

28. The element according to claim 27, wherein the rough surface is a toothed grip element incorporated in the element.

29. The element according to claim 23, wherein the element is made of a material harder than that of the tube wherein the material is composed of metal.

30. The element according to claim 23, wherein the surface of the element intended to abut against the tube is arched in the circumferential direction corresponding to the radius of curvature of the tube.

* * * * *

UNITED STATES PATENT AND TRADEMARK OFFICE
CERTIFICATE OF CORRECTION

PATENT NO.    : 6,257,628 B1
DATED         : July 10, 2001
INVENTOR(S)   : Dries Nijsen It is certified that error appears in the above-identified patent and that said Letters Patent is hereby corrected as shown below:

<u>Title page,</u>
Item [73], Assignee, change "Georg Rischer" to -- Georg Fischer --.

Signed and Sealed this

Eighteenth Day of June, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.      : 6,257,628 B1                                                Page 1 of 1
DATED           : July 10, 2001
INVENTOR(S)     : Dries Nijsen It is certified that error appears in the above-identified patent and that said Letters Patent is hereby corrected as shown below:

<u>Title page,</u>
Item [73], Assignee, delete "Georg Rischer Waga N.V., Pa Epe (NL)" and substitute -- Georg Fischer WAGA N.V., Epe (NL) -- therefor.

Signed and Sealed this

Twenty-third Day of July, 2002

*Attest:*

*Attesting Officer*

JAMES E. ROGAN
*Director of the United States Patent and Trademark Office*